United States Patent [19]

Wilhelm, Jr.

[11] Patent Number: 5,905,889
[45] Date of Patent: May 18, 1999

[54] RESOURCE MANAGEMENT SYSTEM USING NEXT AVAILABLE INTEGER FROM AN INTEGER POOL AND RETURNING THE INTEGER THERETO AS THE NEXT AVAILABLE INTEGER UPON COMPLETION OF USE

[75] Inventor: George William Wilhelm, Jr., Endwell, N.Y.

[73] Assignee: International Business Machines Corporation, Armonk, N.Y.

[21] Appl. No.: 08/820,996

[22] Filed: Mar. 20, 1997

[51] Int. Cl.⁶ ........................................................ G06F 9/00
[52] U.S. Cl. ............................ 395/674; 395/726; 395/293
[58] Field of Search ................................... 395/674, 675, 395/726, 876, 728, 872, 293–305

[56] References Cited

U.S. PATENT DOCUMENTS

| | | | |
|---|---|---|---|
| 4,320,451 | 3/1982 | Bachman et al. | 364/200 |
| 4,750,116 | 6/1988 | Pham et al. | 395/674 |
| 5,093,912 | 3/1992 | Dong et al. | 395/674 |
| 5,301,328 | 4/1994 | Begur et al. | 711/201 |
| 5,305,455 | 4/1994 | Anschuetz et al. | 395/700 |
| 5,432,908 | 7/1995 | Heddes et al. | 711/147 |
| 5,440,740 | 8/1995 | Chen et al. | 395/674 |
| 5,463,776 | 10/1995 | Voigt et al. | 707/101 |
| 5,522,077 | 5/1996 | Cuthbert et al. | 395/683 |
| 5,717,614 | 2/1998 | Shan et al. | 364/579 |
| 5,740,448 | 4/1998 | Gentry et al. | 395/726 |

*Primary Examiner*—Thomas C. Lee
*Assistant Examiner*—Harold J. Kim
*Attorney, Agent, or Firm*—Shelley M Beckstrand

[57] ABSTRACT

A system and method for managing access by a user to a reusable resource. An integer pool is provided, along with program and hardware structures for obtaining an integer from the integer pool, for returning an integer to the integer pool. Responsive to the integer pool being empty, the user is waited. The integer pool includes a NEXT control structure from which a next integer is obtained for use and into which an integer is loaded upon being made available for reuse. The integer pool includes, for holding integers received from or to be provided to said NEXT control structure, (a) a LIFO stack or (b) a linked list by proxy. Reusable resources include data buffers, hardware status bits, logical connections and/or data channels.

13 Claims, 6 Drawing Sheets

RESOURCE MANAGEMENT SYSTEM USING NEXT AVAILABLE INTEGER FROM AN INTEGER POOL AND RETURNING THE INTEGER THERETO AS THE NEXT AVAILABLE INTEGER UPON COMPLETION OF USE

CROSS-REFERENCES TO RELATED APPLICATIONS

The following U.S. patent applications relate in certain respects to the system and method of the invention, the teachings of which are incorporated herein by reference.

U.S. patent application Ser. No. 08/820,181, filed Mar. 14, 1997 by G. W. Wilhelm, Jr. for Stationary Queue for Scarce Resource Management, still pending.

U.S. patent application Ser. No. 08/731,809, filed Oct. 21, 1996 by J. W. Feeney, et al. for Method and Apparatus for Maintaining Message Order for Multi-user FIFOs, still pending.

U.S. patent application Ser. No. 08/734,946 filed Oct. 22, 1996 by J. W. Feeney at al. for Multi-tasking Adapter for Parallel Network Applications, still pending.

BACKGROUND OF THE INVENTION

1. Technical Field of the Invention

This invention relates to a resource management system and method. More particularly, it relates to a reusable integer pool for managing access to any reusable resource, including, but not limited to, data channels, data buffers, hardware status bits and logical connections.

2. Background Art

This invention addresses a class of problems that occur in either device driver or application program design. This class of problems can be identified by the following set of characteristics:

1. A limited number of resources of some type are available to the program which cannot be used by more than one user simultaneously. Permission to use such a resource must be obtained before attempting to use it.
2. The permission to use a resource is a "ticket" for a specific resource only (i.e., buffer #1, or program #5, or channel #2, etc.)
3. The maximum number of possible requesters exceeds the maximum available resources (otherwise, permanent assignment of a resource to each requester could be made thereby obviating the entire problem and this solution).

The resource(s) in question can be one of a wide variety of typical system resources. This background will focus on two such areas of application: (1) buffers in main storage on an adapter, and (2) status register bits. Inasmuch as the prior art approaches are different given the specifics of the problem, there is a need in the art to provide a single common approach that is superior to each specific prior art approach.

Application developers often use data buffer areas as sources or targets of operations such as direct memory access (DMA). In many cases, buffers cannot be allocated on-the-fly. This might be for performance reasons, due to limited storage capacity, or because buffers for DMA operations must be in a specific physical address location. In such a case, some number of buffer areas must be prepared for later use. These buffers must then be tracked or managed as they are doled out, used, and then returned by a subprocess to be available for use by another. This management is essential to prevent errors that would occur if more than one thread or process attempted to utilize the same buffer simultaneously.

Figure 1:
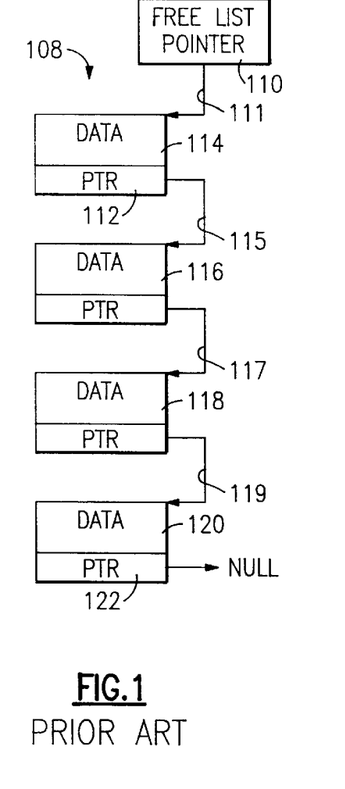
FIG. 1 illustrates the prior art linked list of free data areas.
Figure 2:
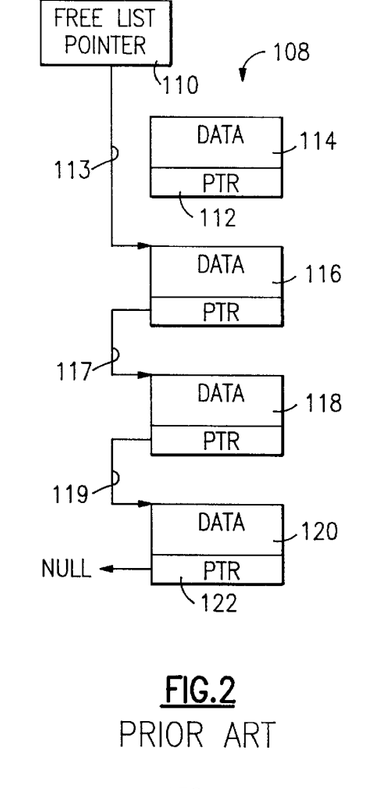
FIG. 2 illustrates the prior art free list of FIG. 1 upon allocating access of a data area resource to an application.

Referring to FIGS. 1 and 2, the prior art approach is to allocate an array of such data buffers and to chain them together in the form of a linked list 108. In this case there are four available buffers 114, 116, 118, 120. Referring to FIG. 1, the variable "free-list" 110 is a pointer to first buffer 114. Each buffer area, in turn, has a pointer 112, 115, 117, 119 to the next available buffer. The final buffer 120 in the chain has a pointer value 122 of 0 indicating the end of list. When a data buffer is requested, free-list pointer 110 is consulted. If it is non-zero, a buffer is available. The pointer to it is "given" to the requesting process (it now has access to that buffer) and the free-list variable is updated to point to the next available buffer.

Referring to FIG. 2, the state of list 108 following this operation is shown. First buffer 114 is in use by a process, and free list pointer 110 now points 113 to next buffer area 116, which is now the first available buffer in list 108. Operation continues with processes requesting buffers (and receiving access to them) so long as there are free buffers. When a process is finished using a buffer, it returns it to the list in an process which is the inverse of that used to obtain a buffer. The "next" pointer 112 in the buffer structure 114 being returned is updated with the current free-list pointer 113, and the free_list pointer 110 is updated with the address 111 of the buffer 114 being returned.

There are several drawbacks to this approach, as follows:

1. Precious buffer space is consumed by the pointer variable 112, 122 that must be allotted in each buffer area. This space exists only to manage the linked list and serves no other useful purpose with respect to the actual use of the buffer. For larger numbers of data buffers, with pointers that might consume 4 bytes each, this can add up.
2. Depending upon the underlying hardware and operating system architecture (e.g., OS/2, Windows NT), these pointers 112, 122 may be what are known as "far" pointers. Far pointers are pointers to memory that lies in another memory segment. Accessing data in a far segment consumes additional CPU cycles since segment registers must be reloaded, and when this is done, a variety of hardware checks are performed "under the covers" to validate the new segment access.

Access of data through far pointers is often a simple necessity, but the prior art method which employs a list 108 of far memory structures 114, 116, 118, 120 via a chain of pointers 111, 115, 117, 119 requires the manipulation of far memory pointers simply to manage the list. Consequently, there is a need in the art for a system and method which requires no far memory manipulations until the buffer is actually to be accessed.

A recurring problem in device driver or application software development is the need to manage or otherwise track the use of a limited number of serially re-useable resources. Serially re-useable implies that the resource is not consumed or otherwise destroyed by its use (it is 'returned' when its use is finished) and, most significantly, implies that the resource may not be used by more than one user at a time.

A device driver design often encounters this type of problem when controlling an adapter that provides facilities for performing a requested operation and, on completion of the operation, the adapter informs the requester by setting a status bit in a register. Assuming a 32-bit architecture, the adapter may have 32 individual status bits for reporting completion status on up to 32 individual operations at a time.

In order to distinguish between an operation completed for one requester versus that performed and completed for another, the device driver must assign a unique completion status bit in a bit-mapped status register for a given requester (and must be looking for the setting of that specific status bit and no other). Finally, when the requested operation is complete, the status bit (likely distinguished by its integer bit number) must be made available for reuse by some other requester as there might be more total requesters than available bits.

Figure 3:
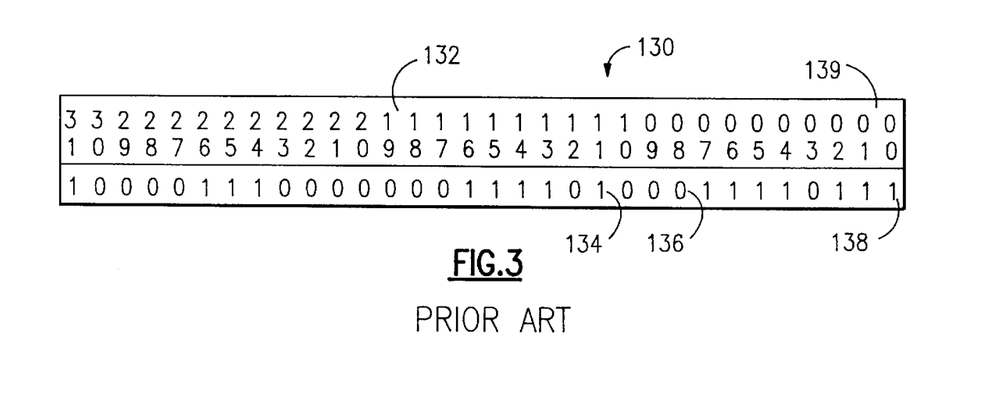
FIG. 3 illustrates a prior art shadow shift register.

Referring to FIG. 3, a 32-bit "status" register is shown. Each bit 134, 136, 138 in bit positions 00–31 in register 130 indicates the completion status of a certain operation. For example, a number of bits 134, 138, etc., are "set", indicating the completion status of processes (or requests) corresponding to status bit positions 132 of 31, 24–26, 13–16, 11, 4–7, and 0–2. Thus, an adapter may be able to handle multiple outstanding requests to perform an operation, and it reports the completion status by setting a bit 134, 138, etc., in status register 130 corresponding to that request.

For multiple requests to be tracked, there must be a mechanism for uniquely assigning bits to requests and reusing the bits when the current request is completed. Referring further to FIG. 3, the common approach to this problem is to keep a shadow copy of status register 130 having bit positions 132, setting a bit 134 in the shadow when that status bit number is passed out to a requesting process, and clearing a bit 136 when the bit is no longer needed. The inefficiency in this approach is that shadow register must be scanned each time another process requests a status bit 134, 136 for use. This scanning is typically performed by shifting the shadow and testing the least significant bit position 00 139 to see if it is zero. If it is, then the number of shifts performed yields the status bit that can be used. In a steady state case, where bits are being "checked out" and returned at random intervals, approximately 16 such shift and test operations will be required, on the average, to find a free, available status bit. In the worst case, 32 shift and test operations will be required to determine that there is no bit available for use. There is, therefore, a need in the art for a system and method for checking out and returning N individual bits without requiring up to N shift and test operations.

Application designs can also encounter this class of problem. Suppose a multi-threaded application program has a limited number of data buffers for use in some type of operation (e.g. for reading data from a disk, or receiving messages from a network). As in the device driver register bits case, there may be more application threads than there are available data buffers. In this case each thread must obtain exclusive, temporary, use of a data buffer and, when finished, free it for use by another thread.

Both the device driver status bit and application data buffer problems are exactly the same: there exists a limited set of N resources which can be described by the set of integers 0 through N–1 (or 1 through N) and there are more than N users of said resource. Prior to using the resource, a unique integer index must be obtained which cannot be used simultaneously by more than one user, and which must be made available for use by others when the current operation is completed.

There are several solutions to this type of problem—these solutions differ according to the exact circumstances of the problem. That is, the 'standard' solution to the device driver status bit problem is not the same as the standard solution to the application data buffer problem.

Consequently, there is a need in the art for a system and method that provides a unique, highly efficient alternative that may be applied to any such problem, regardless of specific circumstances, that may be accurately described as requiring a unique selection from the integers 0 through N–1.

U.S. Pat. No. 5,432,908 by M. Heddes, et al. provides for managing a set of reusable buffers. It uses a linked list-like technique for tracking free buffers and a set of rules for determining whether a request can be filled. Heddes only manages a set of buffers, uses an allocated buffer linked list, and the management entities are implemented as concurrently operating hardware units. There is, consequently, a need in the art for a resource management system and method which deals with any reusable resource, including data channels, data buffers, hardware status bits, logical connections; which does so without the use of linked lists or pointers; and which implements the rules by which a pool of integers is accessed with a small set of state variables and routines not requiring additional special hardware.

It is an object of the invention to provide an improved system and method for managing reusable system resources.

It is an object of the invention to provide an improved system and method for managing buffers in main storage.

It is an object of the invention to provide an improved method for managing storage on an adapter.

It is an object of the invention to provide an improved method for managing status register bits.

It is an object of the invention to provide an improved and single common approach for managing diverse system resources, including but not limited to buffers in main storage, storage on adapters, and status register bits.

It is an object of the invention to provide an improved system and method for managing buffers in main storage which requires no far memory manipulations until the buffer is actually to be accessed.

It is an object of the invention to provide an improved method for managing the selection of unique bits from among the integers 0 through N–1 or, alternatively, from among the integers 1 through N.

It is an object of the invention to provide a system and method for checking out and returning N individual bits without requiring up to N shift and test operations.

Finally, it is an object of the invention to provide a resource management system and method which deals with any reusable resource, including data channels, data buffers, hardware status bits, logical connections; which does so without the use of linked lists or pointers; and which implements the rules by which a pool of integers is accessed with a small set of state variables and routines not requiring additional special hardware.

SUMMARY OF THE INVENTION

This invention provides a system for managing access by a user to a reusable resource. The system includes an integer pool, get means for obtaining an integer from the integer pool, and put means for returning an integer to said integer pool. In accordance with a further aspect of the invention, the system includes means responsive to the integer pool being empty for waiting said user.

In accordance with the method of the invention, access by a user to a reusable resource includes the steps of establishing an integer pool; responsive to a user request, obtaining an integer from the integer pool for exclusive use by the user; and responsive to release by the user of the integer, returning the integer to said integer pool.

BEST MODE FOR CARRYING OUT THE INVENTION

Figure 4:
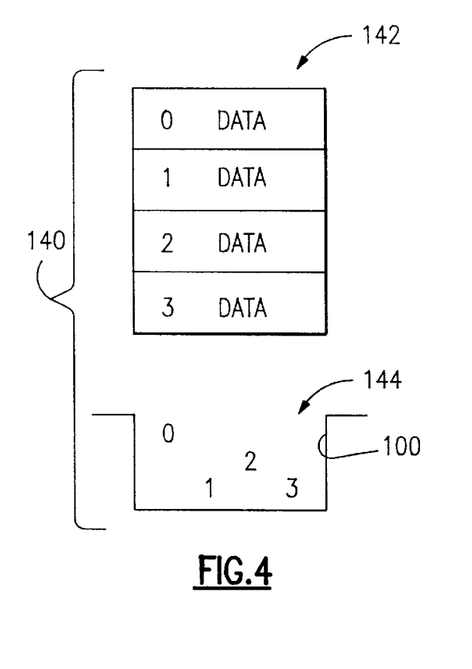
FIG. 4 illustrates the take-a-number-from-a-hat approach of the present invention.

Referring to FIG. 4, in accordance with this invention, an efficient solution to the problem of dealing out unique numbers from the set 0 through N−1 and then allowing them to be returned for reuse by other users is provided by creating an integer pool object 100. The integer pool can be likened to having a hat full of strips of paper 144, each of which has a unique number from the set 0 through N−1 written upon it. When a resource is needed, reaching into the hat and pulling out a number 144 guarantees a unique integer that no other user has. When the user is finished with the number 144, it is put back into the hat.

Referring further to FIG. 4, the management of disbursement of buffers 142 is done via integer pool 100. Ignoring for the moment the mechanics of the pool, FIG. 4 illustrates the concept of placing the available numbers 144 into a hat 100. Initially, the hat contains all the buffer numbers (in this example, numbers 0, 1, 2, and 3.) Now, when a buffer 142 is requested, the requester reaches into the hat and (if it is not empty) obtains the number 144 of a free buffer 142. Since integer pool 100 is implemented in near memory, no far memory manipulations are used to manage the resource. Only when a far memory buffer 142 is actually used is there a far data access.

Further, since only simple integers 144 must be stored in the pool, not far pointers, the total system storage 140 required to implement this approach is reduced. For example, to manage a far linked list of 250 buffers 142 in the prior art approach requires an additional 1004 bytes of memory (250 buffers times 4 bytes per pointer, plus 4 bytes for the free list pointer). In accordance with this invention, only 251 bytes are required to manage the same set of buffers 142 (250 integers in the pool times 1 byte per integer, plus 1 bytes for pool "head", described hereafter as control structure NEXT 210).

For 255 or fewer managed far buffers 142, the system and method of this invention require but one-fourth of the space allotted to manage the far list in the prior art. For a number of buffers from 256 to 32767, this invention uses one-half of the space required to manage the far list in the prior art. Only when the number of managed buffer objects 142 is 32768 or greater do the storage requirements of the two approaches become the same. In this case, however, the disclosed approach is still superior because of the far memory accesses which are avoided.

If buffers or structures 142 are not in system memory but, instead, on an I/O adapter 166 (FIG. 6), the preferred solution is still to use the integer pool approach. In this case, it may actually be impossible to add an additional member (the linked list pointer) to the buffer structure. Also, memory-mapped adapters 166 usually have significantly less memory 168 than system memory, making the memory savings all that more important.

Figure 5:
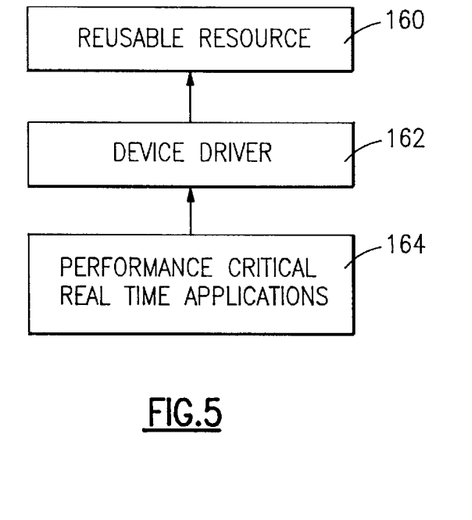
FIG. 5 is a very high level system diagram illustrating one advantageous use of the invention.
Figure 6:
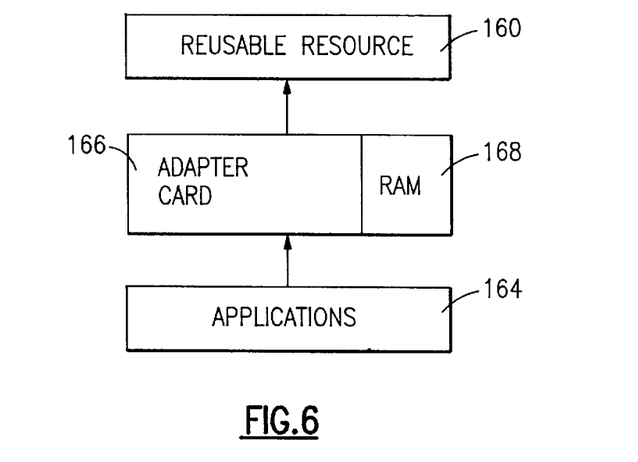
FIG. 6 is a very high level system diagram illustrating a second advantageous use of the invention.

Referring to FIGS. 5 and 6, the system and method of the invention requires minimal overhead and memory to control and/or ration out a limited resource 160. As illustrated in FIG. 5, a performance critical real time application 164 requires access to reusable resource 160 through device driver 162. As is illustrated in FIG. 6, applications 164 require access to reusable resources 160 through adapter card 166 containing limited RAM resources 168.

Figure 7:
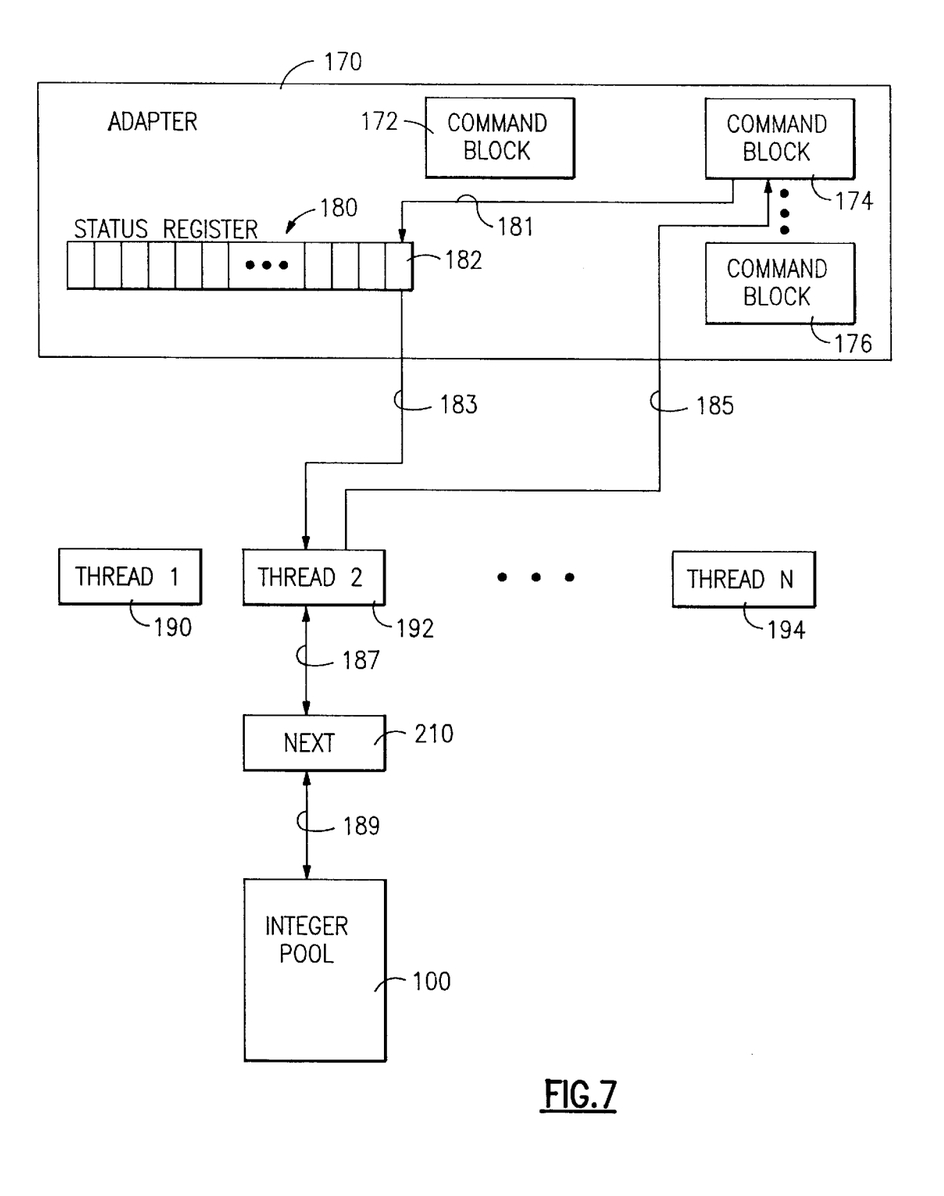
FIG. 7 is a system diagram illustrating the integer pool of the invention within an illustrative system for its use.

Referring to FIG. 7, adapter 170 provides within its memory a plurality of command block areas 172, 174, 176 and a status register 180. External to adapter 170 are a plurality of threads 190, 192, 194 which contend for resources managed by adapter 170, an integer pool 100, and a control structure next 210. As is represented by line 181, a command block 174 may set/reset a bit 182 within status register 180. As is represented by line 185, thread 192 communicates request operation and control information to command block 174, and as is represented by line 183, checks bit 182 in status register 180 for status of the requested operation. As is represented by line 187, thread 192 (and also threads 190, 194) accesses control structure next 210 to get or replace over line 189 an integer in integer pool 100.

Referring further to FIG. 7, in operation adapter 170 is responsive to requests to perform operations. These operations are requested by filling in a command block, such as command block 174. When the processing of command block 174 completes, a flag, or bit, is set in status register 180. The exact bit (in this example, bit 182) in status register 180 is determined by an integer value written into command block 174 by requester 192 of the operation.

Thread 192 desires adapter 170 to perform an operation on its behalf. In order to do so, it needs a unique command block 174 for commanding the operation and a unique bit 182 in status register 180 by which completion of the commanded operation can be indicated.

Thread 192 obtains a unique integer for the desired operation by accessing integer pool 100 via next control structure 210. If next 210 contains the value −1, there are no integers available. This indicates that there are also no command blocks 172, 174, 176 or status register 180 bits available. In this case, thread 192 must wait until a resource is freed. One approach for managing the orderly waiting and obtaining of scarce resources when they are not available is taught by the aforementioned patent application, Ser. No. 08/820,181, filed Mar. 14, 1997.

If next control structure 210 is not equal to −1, next value 210 is the integer that may be used by thread 192. Next value 210 is updated to indicate the next value available from integer pool 100, which may be a −1 if thread 192 took the last integer.

Once thread 192 has its integer, it fills in the corresponding command block 174 on adapter 170 indicating the desired operation to performed. It also indicates in command block 174 the integer value, or index, of the bit 182 in status register 180 that is to be used to indicate completion of the commanded operation.

Once adapter 170 has processed command block 174, it indicates completion of the operation by setting bit 182 in status register 180 corresponding to the integer value written into command block 174 by thread 192.

Thread 192 is either polling status register 180 waiting for its bit 182 to be set, or an interrupt is generated when status register 180 is updated with completion status bit 182. In either event, thread 192 now knows that its operation has been completed and it returns the integer it was using to the control structure next 210, forcing the current next 210 value back into integer pool 100.

Operations used to get an integer from or return an integer to integer pool 100 using the next control structure 210 are described in connection with Tables 1 through 9 and FIG. 10. Examples of the state of next structure 210 and integer pool 100 at illustrative times are described hereafter in connection with FIGS. 8 and 9.

Figure 8:
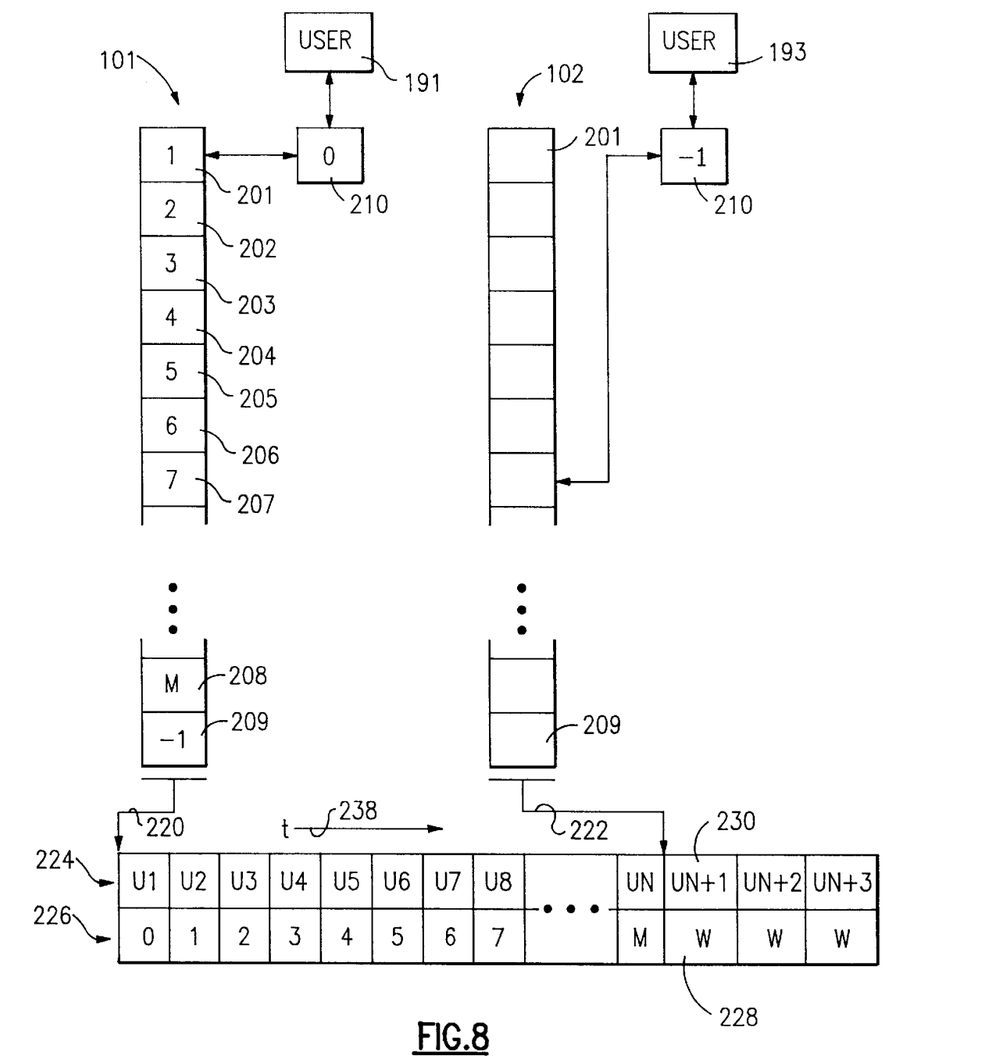
FIG. 8 is a state diagram and table illustrating both the initial fully loaded condition and also the empty condition of the integer pool object of the invention, organized as a LIFO stack.

Referring to FIG. 8, the initial, filled state 101 of integer pool 100 (FIG. 7), and the empty state 102 of integer pool 100 is illustrated. In this example, users 191, 193 are process thread requiring an integer from integer pool 100, which is a LIFO stack having M+1 integer positions 201 through 209, which, at time 220 has been initialized to include integers 1, 2, ..., M and −1, with the integer value 0 loaded into next structure 210. Integer pool 100 is at state 102 at time 222, when user 193 accesses next structure 210 for an integer from the pool. The pool, in state 102, is empty, and user UN+1 193 finding the integer value −1 in next structure 210, must wait (W) 228. This state 102 results from a succession over time 238 of users 224 (U1 through UN) removing all integers 226 from pool 100 without any being replaced.

Figure 9:
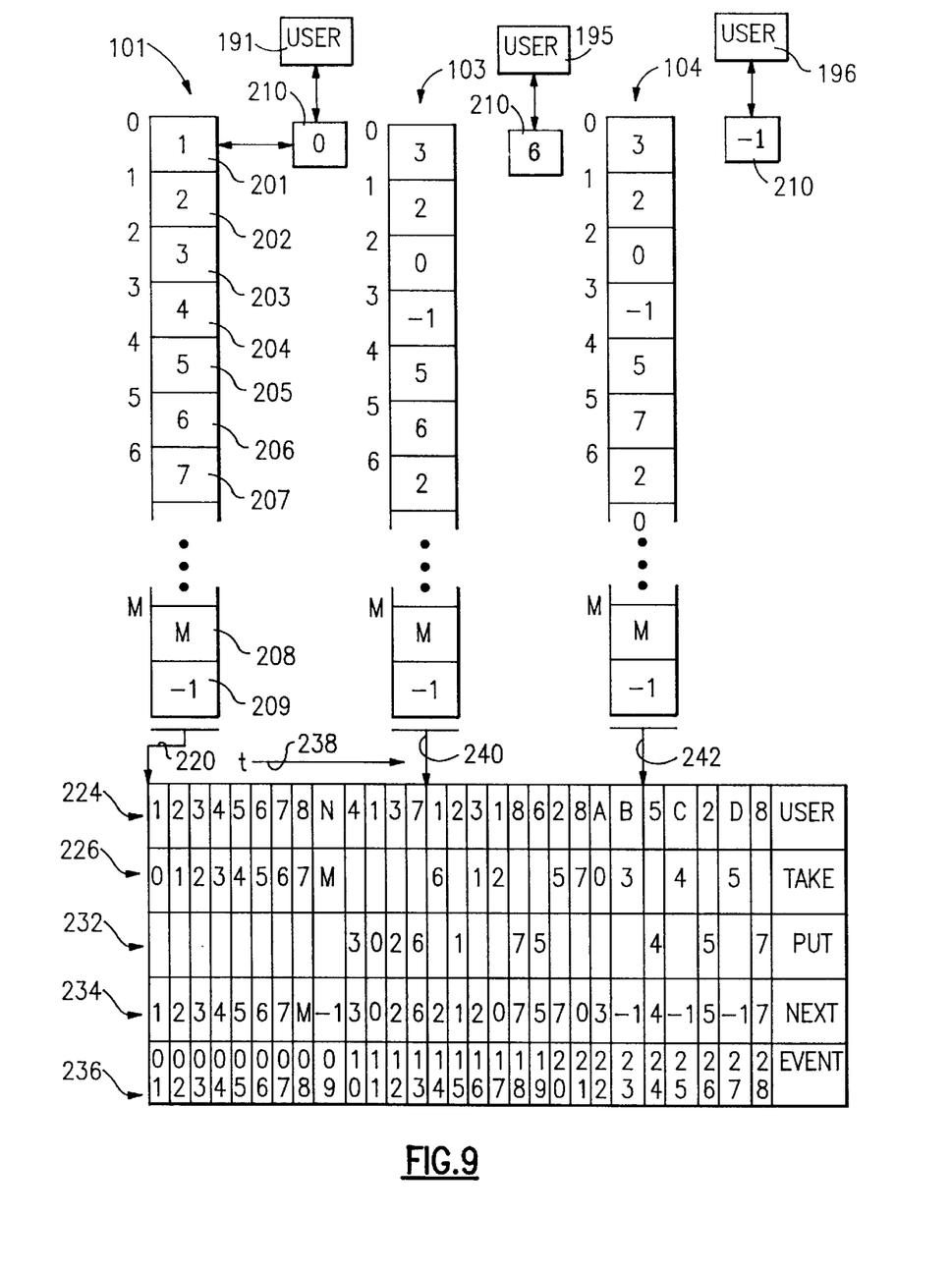
FIG. 9 is a state diagram and table illustrating representative temporal states of the integer pool object of the invention, organized as a linked list by proxy.

Referring to FIG. 9, various states 101, 103, 104 of integer pool 100 are illustrated at initiation time 220, and at subsequent times 240, 242. In this table, row 224 identifies users 1, 2, ..., 2, D, 8 who access pool 100 in successive events 236 to take or put integers; row 226 indicates the integer taken from control structure 210, row 232 indicates the integer returned to control structure next 210, and row 234 indicates the integer residing in next 210.

In accordance with this preferred embodiment of the invention, array 100 is organized as a linked list by proxy. Thus, an element in array 100 is changed when a PUT is done. The change is such that the value of NEXT 210 prior to the change is written into array 100 at the element position whose index value equals the number being PUT, which is itself now in the NEXT structure 210. When a value is taken from array 100, the array is not changed. Thus, at time 220, NEXT 210 value=0 indexes to the 0th position, which at state 101 contains a 1. At time 240, NEXT value 210=6 indexes to the 6th position, which at state 103 contains a 2. And, finally, at state 104, NEXT structure 210 contains −1, indicating that no integer values are available for use and there is now no valid connection from NEXT structure 210 to array 100 (in its state 104.) In state 101, array 100 contains the values 1, 2, 3, 4, 5, 6, 7, ..., M, −1 at index positions 0, 1, 2, 3, 4, 5, 6, ..., M, M+1, respectively. In state 103, array 100 contains the values 3, 2, 0, −1, 5, 6, 2, ..., M, −1 at those index positions; and in state 104 the array 100 values are 3, 2, 0, −1, 5, 7, 2, ..., M, −1. These values result from the sequential TAKES and PUTS illustrated at rows 226 and 232.

At event 236 time=13, user 224=7 puts integer 6 into structure 210, and state 103 results, with integer 6 in structure 210, integers 2, 0, and 3, available for use in stack 100, which, however according to the rules for managing a linked list by proxy explained above, contains values 3, 2, 0, −1, 5, 6, 2, ..., M, −1. Similarly, at event 236 time=23, user 224=B takes integer value 3 from structure 210, and state 104 results, with integer −1 in structure next 210. A −1 in NEXT structure 210 indicates that none of the integer values in pool 100, such as a pool in state 104, are available for use.

An integer pool 100 organized as a linked list by proxy is functionally equivalent to a LIFO stack, but much more efficient—inasmuch as the former does not require the shifting operations in some implementations required when putting and popping from a LIFO stack.

To implement integer pool 100, a definition of the integer pool 'object' is required, and also the following methods:

1. Integer Pool initialization

This method is invoked prior to the first use of the pool 100. It prepares the integer pool for use.

2. Obtain an integer from the pool

This method is invoked by a user in order to obtain an integer (resource) 144. This method also provides a means for indicating that pool 100 is empty (all integers 144 have been removed, indicating that all resources 142 are in use).

3. Return an integer to the pool

This method is invoked to release a resource 142 by returning the associated integer 144 to the pool for selection by another user.

Integer Pool Definition

An integer pool large enough to accommodate N resources is defined by two variables: a single integer 210 that holds the 'next' available resource, and an array 100 of N integers. 'C' code that defines such a pool is set forth in Table 1.

TABLE 1

INTEGER POOL DEFINITION

| int | next; | // the next available integer |
|---|---|---|
| int | pool[N]; | // the pool of N integers |

Integer Pool Initialization

Integer pool 100 is initialized by 'linking' the pool together in the fashion of a linked list of objects (except that the list contains only the links!), and by initializing the next variable to 'point' to the first integer in the pool. Table 2 provides 'C' language code that illustrated Integer Pool Initialization.

TABLE 2

INTEGER POOL INITIALIZATION

| next = 0; | // point to the first integer |
|---|---|
| for ( i = 0 ; i < N−1 ; ++i ) | |
| pool[i] = i + 1; | // link the pool together |
| pool[N−1] = −1; | // mark the end of the pool |

Obtain an Integer from the Pool

To obtain an integer from pool 100, user 192 examines the variable, next 210. If not equal to −1, the integer value of next 210 is an available integer number. In that case, user 192 has sole possession of that integer and 'pops' the next available integer from pool 100 into the next variable 210. Table 3 sets forth a 'C' language example of this method.

TABLE 3

OBTAIN AN INTEGER FROM THE POOL

```
int ObtainInteger( void )
{
    if (next != -1) {           // if the pool is not empty . . .
        int temp = next;        // then save the one we will
                                // use
        next = pool[next]       // and update the next integer
        return( temp );         // return the saved integer to
                                // the user
    }
    else {                      // else the pool was empty, so
        return( -1 );           // return the empty indicator
    }
}
```

Return an Integer to the Pool

To return an integer to pool 100, user 192 places the integer back into the next variable 210, and updates the pool linkage. Table 4 sets forth a 'C' language example of this method.

TABLE 4

RETURN AN INTEGER TO THE POOL

```
void ReturnAnInteger( int returned )
{
    pool[returned] = next;      // move the 'next' integer
                                // back into the pool
    next = returned;            // the returned integer is
                                // always next
}
```

It is required that the users of integer pool 100 cooperate with the scheme by adhering to a simple set of rules, as follows:

1. Users 190, 192, 194 cannot use an integer that they did not obtain from the pool.
2. Users 190, 192, 194 must return integers to pool 100 when finished with them.
3. Each user 190, 192, 194 must check for a return value of −1 when attempting to obtain an integer (resource), in which case pool 100 is empty and they must wait and try again later.
4. A locking mechanism must be used to ensure that two requesters 190, 192 do not simultaneously access pool 100 and receive the same integer. A mechanism for this lock is provided by all multi-tasking operating systems.

The system and method of the invention are a unique form of linked list, a linked list-by-proxy. A standard linked list is formed by chaining the nodes of the list together via pointers contained within the nodes themselves. In the system and method of the invention, integer pool 100 are but links of the list, kept separate from the list itself.

In accordance with this embodiment of the invention, a pool of re-useable integers is used to form a linked list "by proxy." Instead of forming a linked list of the buffer structures, which wastes space within the buffer, and may require far pointers to form the links, an array of buffers 142 is allocated as shown in FIG. 4. Each buffer area 142 is associated with a unique integer number 144. These numbers 144 must begin at 0 and run up through the number of buffers (minus one).

Figure 10:
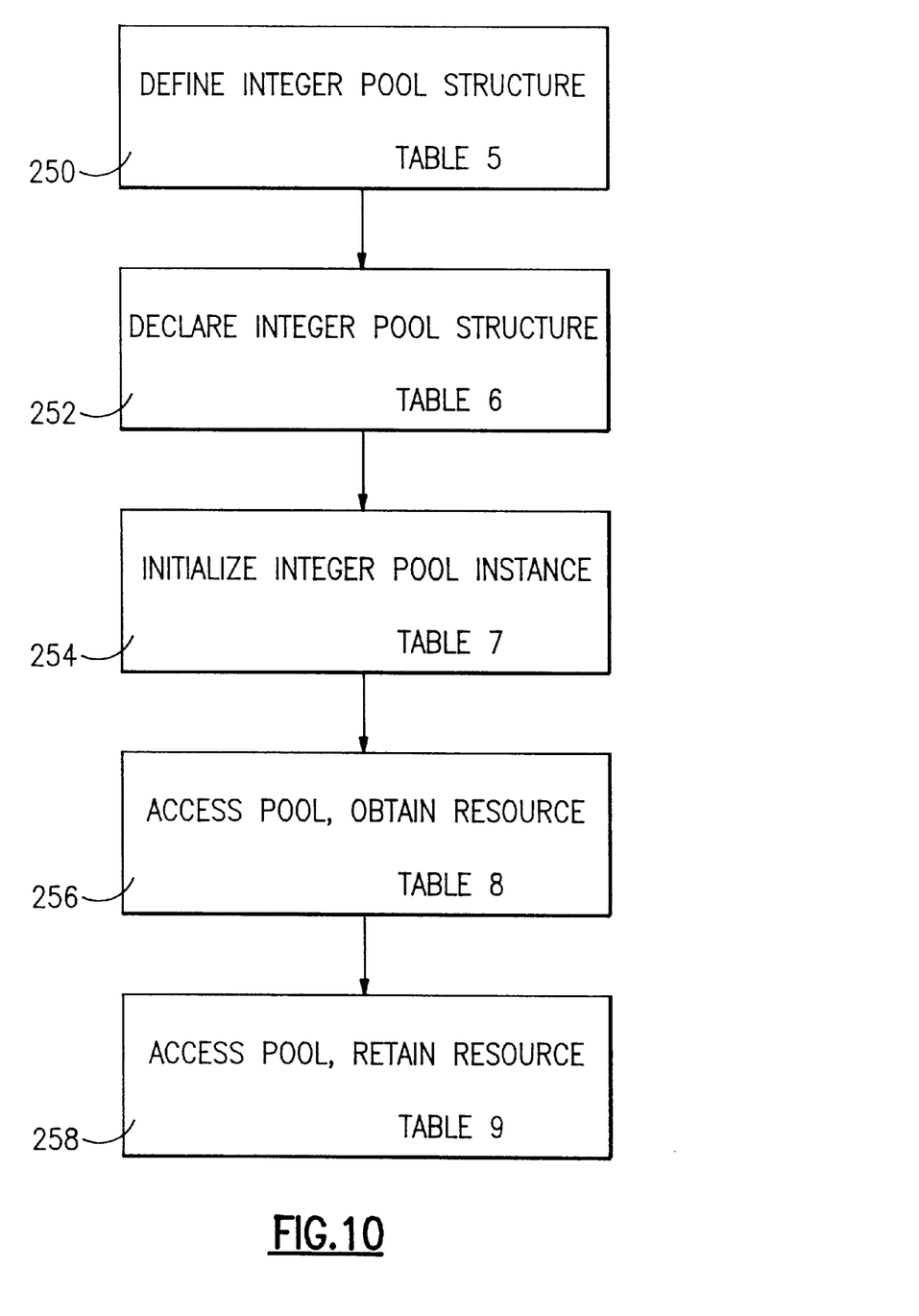
FIG. 10 is a flow diagram for describing the particular, preferred embodiment of the system and method of the invention set forth in Tables 5 through 9.

Referring to FIG. 10, a further preferred implementation of the system and method of the invention will be described in connection with Tables 5 through 9, represented by blocks 250, 252, 254, 256 and 258, respectively. Table 5 sets forth the basic control structure for integer pool 100. This is followed in memory by pool 100 itself, which is an array of integers.

Table 6 declares that array of integers. This is a declaration of the integer pools, in this case, three pools 100 since NUM_FIFOS is equal to 3 for this embodiment of the invention. (In this example, "FIFO" refers to the objects being managed, and not to LIFO pool 100.) The pools themselves are 32 integers deep. The initialize code for the pool and the routines that get or return resources use the pool structure in order to access the spparray (which is pool 100). The object(s) managed through this pool are send programs and associated status bits. There are 32 such resource objects for each of three FIFOS. A given thread or process may use up to eight of these resources at a time. So, these are scarce compared to the possible number of user threads.

Table 7 sets forth the code that initializes the pool control structure and the array of integers that makes up the pool. This code is called once, at device driver initialize time, and results in a pool 100 state 101, as is illustrated in FIG. 8.

Table 8 sets forth the code for GetASendProgram( ), a function which consults the send program (that is, integer) pool for a given FIFO. If a program is available, its program number (integer within the integer pool, or array) is returned, and the pool is updated. In this embodiment, if no program (that is, resource) is available (there are no integers in the integer array), this routine uses GetInLine to perform orderly waiting. In this embodiment, GetInLine may be implemented by the stationary queue process set forth in U.S. Patent application Ser. No. 08/828,189, filed Mar. 21, 1997 by G. W. Wilhelm, Jr. for SYSTEM AND METHOD FOR I/O ACCESS MODE SELECTION, the teachings of which are incorporated herein by reference, to perform that wait.

Table 9 sets forth for ReturnASendProgram, which accesses integer pool 100 to return a program number, thus freeing a resource for use by a next process.

TABLE 5

DEFINITION OF INTEGER POOL STRUCTURE

```
/*      This structure defines a pool of re-useable, mutually
 *      exclusive integers. These integers can be associated
 *      with a set of objects of the same order and used to
 *      obtain a single such object for exclusive use. "Getting"
 *      an integer from the pool means that the corresponding
 *      object is then unavailable for use by others.
 *      "Returning" the integer to the pool means that the
 *      corresponding object is once more available.
 */
#define IN_USE      -1
#define COMPLETE    -2
struct Pool {
    int next;
    int *array;
};
```

TABLE 6

INSTANCE OF AN INTEGER POOL STRUCTURE

```
struct   send_program_pool[NUM_FIFOS];
Pool
int      spparray[NUM_FIFOS][NUM_SEND_PGMS_PER_FIFO];
```

TABLE 7

CODE TO INITIALIZE AN INSTANCE OF AN INTEGER

```
/*
 *      InitProgramPools( )
 *
 *      This function initializes all the integer pools used in
 *      tracking the use of send Programs.
 *
 */
void
M_InitProgramPools
        (
        AIX_VOID_PARM      /* Parameter for AIX only   DO NOT
                            *  follow with a comma            */
                           )
{
    int        i;
    int        j;
    struct Pool     *pp;
    for ( i = 0 ; i < NUM_FIFOS ; ++i ) {
        pp = &acb.send_program_pool[i];
        pp->next = 0;
        pp->array = &acb.spparray[i] [0];
        for ( j = 0 ; j < NUM_SEND_PGMS_PER_FIFO ; ++j )
            pp->array[j] = j+1;
        pp->array[NUM_SEND_PGMS_PER_FIFO - 1] = IN_USE;
    }
}                   /* end of InitProgramPools( )                */
```

TABLE 8

CODE TO ACCESS THE POOL AND OBTAIN A RESOURCE

```
/*
 *      GetASendProgram( )
 *
 *      This function consults the send program pool for a given
 *      FIFO. If a program is available, this function returns
 *      the program number and updates the pool. If no program
 *      is available, this function gets in line and waits its
 *      turn for one.
 *      The FIFO number argument is in the set (1,2,3) and must
 *      be decremented prior to using it to access arrays that
 *      are indexed 0 . . . 2.
 */
int
M_GetASendProgram
        (
        AIX_ACB_PARM   /*    Parameter for AIX only --
                        *    do not follow with a
                        *    comma                         */
        int        fifo,
        int far    *p_program
        )
{
    struct Pool  *pp;
    int          rc;
    pp = &acb.send_program_pool[fifo-1];
    do {
      if (pp->next >= 0) { /*  non-negative means not in
                             *  use in any way            */
         *p_program = pp->next;  /*  return the available
                                  *  number                */
         pp->next = pp->array[pp->next];  /*  update the
                                            *  free list   */
         return( 0 );                    /*  SUCCESS! */
      }
      /*   We failed to get a free program. Get in line
       *   (wait) for one.
       */
      rc = GetInLine( VS_SEND_PROG_QUEUE(fifo) );
    } while (!rc);
    return ( rc )
}                          /* end of GetASendProgram( )    */
*/
```

TABLE 9

CODE TO ACCESS THE POOL AND RETURN A RESOURCE

```
void
M_ReturnASendProgram
        (
        AIX_ACB_PARM         /*       Parameter for AIX only
                              *       DO NOT follow with a
                              *       comma                 */
        int       fifo,
        int       returned
        )
{
    struct Pool       *pp;
    pp = &acb_send_Program_pool[fifo-1];
    if (pp->next < 0)         /*      if the list is currently
                               *      empty                 */
        pp->array[returned] = IN_USE;  /*    then mark this
                                        *    one as the
                                        *    end            */
    else                            /*  else                */
        pp->array[returned) = pp->next;  /*    push the
                                          *    list down    */
    pp->next = returned;     /*     the returned number is
                              *     always taken next       */
    /*
     *   We have freed a resource. Announce to the
     *   next process that may be waiting for a
     *   resource that one is available.
     */
    NowServing( VS_SEND_PROGRAM_QUEUE(fifo) );
}                      /* end of ReturnASendProgram     */
```

Advantages over the Prior Art

Referring to FIGS. 5 and 6, the system and method of the invention requires minimal overhead and memory to control and/or ration out a limited resource 160. This enhances the cost/performance of a product, especially where the memory in question is expensive RAM 168 on an adapter card 166, or if the device driver 162 is directly in the path of some performance critical real time application 164.

Two different alternatives have classically been employed to solve the two variants of this problem as previously described.

Referring again to FIG. 3, in the case of the device driver status bit example, a standard solution is to maintain a 'shadow' 130 of the status register 180. As status bits (integers) are assigned to a user, they are flagged 134 as in use in the shadow register 130. When the operation is finished, the status bit is flagged 136 as available in the shadow register 130.

Referring again to FIGS. 1 and 2, in the case of the application data buffer example, the typical solution is to chain the available data buffers 108 together in a linked list of free buffers. When a user (aka, thread) needs a buffer he examines the free list 108 and, if not empty, the first (or last) element 114 of the list is "taken", and the list is updated (the chain is shortened). When a buffer 114 is freed, it is linked 111, 115 back into the free list 108 and is then available for reuse.

One advantage of the system and method of the invention is that it is more efficient than the 'shadow' method described above. Finding a free resource in that method involves scanning the shadow register for a bit that is not flagged as in use. Thus, the time to find a free resource increases as more of them are in use. If no resources are free (or only one), every resource 'bit' may have to be examined; in the 32-bit example, 32 operations are required to find the last free resource (or that none are available). The system and method of the invention require but a single access to the pool to either obtain a free resource or to learn that none are free. Though similar in principle to the linked list approach, the disclosed method is also superior to it for efficiency reasons. In the data buffer example, the linked list approach would reserve a storage location in each buffer, a 'pointer' to be used for forming the chain. For such data buffer objects in a 32-bit operating system, this would require 32 bits (four bytes) be reserved in each buffer just to support the chaining operation. For one thousand such objects, four thousand bytes of storage would be required for maintaining the chain links alone. In the disclosed method, the tracking of one thousand such objects is done by an integer pool of one thousand 16-bit integers, for a total of only two thousand bytes, or one-half the storage requirement of the linked list approach. Savings of this magnitude seem insignificant when compared to modern machines with many megabytes of storage, but this technique is just as applicable to manage data buffers on an I/O adapter that has significantly less, more expensive, random access memory (RAM.) In fact, the layout of data buffers on an I/O adapter may be fixed such that reserving an element of each buffer for such a link pointer is simply not allowed, in which case the linked list approach cannot be used at all.

Another advantage of the system and method of the invention over the linked list approach is that the latter may involve expensive operations for accessing the free list of far objects. In protected mode operations on the Intel processor, for example, accessing a far data object (one outside of the current segment) involves reloading a selector register. The access rights checking performed by the processor whenever a selector register is reloaded make access to such far data objects more time consuming than accessing near objects in the current segment. Consulting the free list of far buffer objects, removing an element from the list, and later returning the element to the list thus require far data accesses, all of which cost extra CPU cycles. The disclosed approach allows the application (or device driver) to manage a pool of far data objects using access to an integer pool that can be created in the near (current) segment. Thus, for all operations other than the actual use of the far object, the disclosed method requires that only near data manipulations be performed, thus saving CPU cycles for every sequence of querying the availability of, obtaining, and freeing said resource, even if it is a far data object.

Using an integer pool, preloaded with 32 integers (0 . . . 31) allows a free bit to be obtained in a single access to the pool. The mechanism for accessing the pool is little more complicated than the shift and test mechanism and yields a free number in a single operation. Thus, the integer pool method is roughly 16 times faster than the prior art approach. Further, if no status bits are available at all, that fact is discovered in one operation instead of 32.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. A system for managing access by a user to a reusable resource, comprising
    an integer pool;
    get means for obtaining an integer from said integer pool;
    put means for directly returning said integer to said integer pool upon completion of use;
    said integer pool including a NEXT control structure;
    said get means further operative for obtaining a first next integer from said NEXT control structure and causing said NEXT control structure to be loaded with a second next integer from said integer pool; and
    said put means further operative for loading a current integer currently stored in said NEXT control structure deeper into said integer pool and loading said NEXT control structure with a reuse integer being made available for reuse.

2. The system of claim 1 further comprising means for waiting said user responsive to said integer pool being empty.

3. The system of claim 1 wherein said integer pool is a linked list by proxy.

4. The system of claim 1 wherein said reusable resource is a data buffer.

5. The system of claim 1 wherein said reusable resource is a hardware status bit.

6. The system of claim 1 wherein said reusable resource is a logical connection.

7. The system of claim 1 wherein said reusable resource is a data channel.

8. The system of claim 1 wherein a plurality of integer pools are used to manage access to a plurality of different reusable resources.

9. The system of claim 8 wherein said plurality of different reusable resources include two or more data buffers, hardware status bits, logical connections and/or data channels.

10. A method for managing access by a user to a reusable resource, comprising the steps of:
    establishing an integer pool;
    establishing in connection with said integer pool a NEXT control structure;
    responsive to a user request, obtaining an integer from said integer pool for exclusive use by said user; said obtaining step obtaining a first next integer from said NEXT control structure and causing said NEXT control structure to be loaded with a second next integer from said integer pool; and
    responsive to release by said user of said integer, returning said integer directly to said integer pool; said returning step loading an integer previously stored in said NEXT control structure in said integer pool and loading said NEXT control structure with another integer being made available for reuse.

11. The method of claim 10 further comprising the step of waiting said user responsive to said integer pool being empty.

12. A program storage device readable by a machine, tangibly embodying a program of instructions executable by a machine to perform method steps for managing use of reusable resources, said method steps comprising:
    establishing an integer pool;
    establishing in connection with said integer pool a NEXT control structure;
    responsive to a request by a user, obtaining an integer from said integer pool for exclusive use by said user;

said obtaining step obtaining a first next integer from said NEXT control structure and causing said NEXT control structure to be loaded with a second next integer from said integer pool; and responsive to release by said user of said integer, directly returning said integer to said integer pool; said returning step loading an integer previously stored in said NEXT control structure into said integer pool and loading said NEXT control structure with another integer being made available for reuse.

13. A memory device, such as a transmission medium, magnetic or optical tape or disc, for storing signals for structuring the components of a computer to manage use of reusable resources, said components comprising:

an integer pool;

get means for obtaining an integer from said integer pool;

put means for returning said integer directly to said integer pool upon completion of usage;

said integer pool including a NEXT control structure;

said get means further operative for obtaining a first next integer from said NEXT control structure and causing said NEXT control structure to be loaded with a second next integer from said integer pool; and said put means further operative for loading a current integer currently stored in said NEXT control structure deeper into said integer pool and loading said NEXT control structure with a reuse integer being made available for reuse.

\* \* \* \* \*